(12) United States Patent
Fujino et al.

(10) Patent No.: US 9,904,270 B2
(45) Date of Patent: Feb. 27, 2018

(54) NUMERICAL CONTROL APPARATUS FOR MULTI-AXIAL MACHINE

(75) Inventors: Daisuke Fujino, Tokyo (JP); Yukihiro Iuchi, Tokyo (JP); Kenji Okuma, Tokyo (JP); Tomonori Sato, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 557 days.

(21) Appl. No.: 14/408,665

(22) PCT Filed: Jul. 26, 2012

(86) PCT No.: PCT/JP2012/069015
§ 371 (c)(1),
(2), (4) Date: Dec. 17, 2014

(87) PCT Pub. No.: WO2014/016943
PCT Pub. Date: Jan. 30, 2014

(65) Prior Publication Data
US 2015/0205284 A1    Jul. 23, 2015

(51) Int. Cl.
*G05B 19/19*    (2006.01)
*G05B 19/4103*  (2006.01)

(52) U.S. Cl.
CPC ......... *G05B 19/19* (2013.01); *G05B 19/4103* (2013.01)

(58) Field of Classification Search
CPC .............................. G05B 19/19; G05B 19/4103
See application file for complete search history.

(56) References Cited

U.S. PATENT DOCUMENTS 3,882,304 A * 5/1975 Walters .............. G05B 19/4103
                                                        318/569
4,529,921 A    7/1985 Moribe
(Continued)

FOREIGN PATENT DOCUMENTS

DE    10360227 A1    7/2005
DE    602004002997 T2    5/2007
(Continued)

OTHER PUBLICATIONS

Weck, M.; Brecher, Ch.: "Werkzeugmaschinen", vol. 4, "Automatisierung von Maschinen und Anlagen", 6th newly edited ed., Berlin, Springer, 2006, pp. 307-312 (8 pgs total), ISBN 3-540-22507-2.
(Continued)

*Primary Examiner* — M. N. Von Buhr
(74) *Attorney, Agent, or Firm* — Sughrue Mion, PLLC; Richard C. Turner (57) ABSTRACT

A numerical control apparatus includes: a program input unit that reads a tool distal end position and a tool posture and generates designated position sequences of the linear axis and designated position sequences of the rotation axis; a distal-end-position-curve generating unit that generates a tool distal end position curve concerning the tool distal end position; a tool-posture-curve generating unit that generates a tool posture curve concerning the tool posture associated with movements of the tool distal end position; an interpolation calculating unit that calculates an interpolation point of the tool distal end position, calculates an interpolation point of the tool posture, and calculates an interpolation point of a machine position of the linear axis; and an interpolation output unit that moves the linear axis to the calculated interpolation point of the machine position and
(Continued)

moves the rotation axis to the calculated interpolation point of the tool posture.

3 Claims, 9 Drawing Sheets

(56) References Cited

U.S. PATENT DOCUMENTS

| | | | | |
|---|---|---|---|---|
| 5,321,623 | A * | 6/1994 | Ensenat | G05B 19/41 |
| | | | | 318/573 |
| 5,723,961 | A | 3/1998 | Fujino et al. | |
| 6,735,495 | B2 * | 5/2004 | Munz | G05B 19/4103 |
| | | | | 700/187 |
| 7,083,368 | B2 | 8/2006 | Nakazato et al. | |
| 7,274,969 | B2 | 9/2007 | Otsuki et al. | |
| 7,295,891 | B2 * | 11/2007 | Huttenhofer | B25J 9/1664 |
| | | | | 219/124.33 |
| 8,145,347 | B2 | 3/2012 | Nakamura et al. | |
| 8,478,438 | B2 * | 7/2013 | Nishibashi | G05B 19/4103 |
| | | | | 318/567 |
| 2005/0042052 | A1 | 2/2005 | Nakazato et al. | |
| 2016/0350445 | A1 * | 12/2016 | Dowski, Jr. | B24B 13/06 |

FOREIGN PATENT DOCUMENTS

| | | |
|---|---|---|
| DE | 102009003003 A1 | 12/2009 |
| EP | 1544700 A2 | 6/2005 |
| JP | 59-106007 A | 6/1984 |
| JP | 04-259012 A | 9/1992 |
| JP | 09-035054 A | 2/1997 |
| JP | 10-228306 A | 8/1998 |
| JP | 3396342 B2 | 2/2003 |
| JP | 2005-182437 A | 7/2005 |
| JP | 2005-352876 A | 12/2005 |
| JP | 2006-053789 A | 2/2006 |
| JP | 2006-309645 A | 11/2006 |
| JP | 2009-245164 A | 10/2009 |
| JP | 2010-140312 A | 6/2010 |
| JP | 2010-146176 A | 7/2010 |
| JP | 2011-003176 A | 1/2011 |

OTHER PUBLICATIONS

Fujio Yamaguchi, "Shape Processing Engineering (I) Using Computer Display", Nikkan Kogyo Shimbun Ltd., Oct. 1982 & Jun. 1985, pp. 162-179.

International Search Report for PCT/JP2012/069015 dated Oct. 30, 2012 [PCT/ISA/210].

Written Opinion for PCT/JP2012/069015 dated Oct. 30, 2012 [PCT/ISA/237].

* cited by examiner

| No. | AXIS COORDINATE VALUES ||||||| DISTAL END DISTANCE | TANGENT VECTORS OF LINEAR AXES ||| FIVE AXIS COMBINED DISTANCES | TANGENT VECTORS OF ROTATION AXES ||
|---|---|---|---|---|---|---|---|---|---|---|---|---|---|
| | X | Y | Z | B | C | | d | qx | qy | qz | d' | qb | qc |
| 0 | $x_0$ | $y_0$ | $z_0$ | $b_0$ | $c_0$ | | - | $qx_0$ | $qy_0$ | $qz_0$ | - | $qb_0$ | $qc_0$ |
| 1 | $x_1$ | $y_1$ | $z_1$ | $b_1$ | $c_1$ | | $d_1$ | $qx_1$ | $qy_1$ | $qz_1$ | $d'_1$ | $qb_1$ | $qc_1$ |
| 2 | $x_2$ | $y_2$ | $z_2$ | $b_2$ | $c_2$ | | $d_2$ | $qx_2$ | $qy_2$ | $qz_2$ | $d'_2$ | $qb_2$ | $qc_2$ |
| : | : | : | : | : | : | | : | : | : | : | : | : | : |
| j | $x_j$ | $y_j$ | $z_j$ | $b_j$ | $c_j$ | | $d_j$ | $qx_j$ | $qy_j$ | $qz_j$ | $d'_j$ | $qb_j$ | $qc_j$ |
| : | : | : | : | : | : | | : | : | : | : | : | : | : |
| n-1 | $x_{n-1}$ | $y_{n-1}$ | $z_{n-1}$ | $b_{n-1}$ | $c_{n-1}$ | | $d_{n-1}$ | $qx_{n-1}$ | $qy_{n-1}$ | $qz_{n-1}$ | $d'_{n-1}$ | $qb_{n-1}$ | $qc_{n-1}$ |
| n | $x_n$ | $y_n$ | $z_n$ | $b_n$ | $c_n$ | | $d_n$ | $qx_n$ | $qy_n$ | $qz_n$ | $d'_n$ | $qb_n$ | $qc_n$ |

| No. | AXIS COORDINATE VALUES | | | | | | DISTAL END DISTANCE | TANGENT VECTORS OF LINEAR AXES | | | | FOUR AXIS COMBINED DISTANCES | | | TANGENT VECTORS OF ROTATION AXES | | |
|---|---|---|---|---|---|---|---|---|---|---|---|---|---|---|---|---|---|
| | X | Y | Z | B | C | | d | qx | qy | qz | | db | dc | | qb | qc | |
| 0 | $x_0$ | $y_0$ | $z_0$ | $b_0$ | $c_0$ | | - | $qx_0$ | $qy_0$ | $qz_0$ | | - | - | | $qb_0$ | $qc_0$ | |
| 1 | $x_1$ | $y_1$ | $z_1$ | $b_1$ | $c_1$ | | $d_1$ | $qx_1$ | $qy_1$ | $qz_1$ | | $db_1$ | $dc_1$ | | $qb_1$ | $qc_1$ | |
| 2 | $x_2$ | $y_2$ | $z_2$ | $b_2$ | $c_2$ | | $d_2$ | $qx_2$ | $qy_2$ | $qz_2$ | | $db_2$ | $dc_2$ | | $qb_2$ | $qc_2$ | |
| ⋮ | ⋮ | ⋮ | ⋮ | ⋮ | ⋮ | | ⋮ | ⋮ | ⋮ | ⋮ | | ⋮ | ⋮ | | ⋮ | ⋮ | |
| j | $x_j$ | $y_j$ | $z_j$ | $b_j$ | $c_j$ | | $d_j$ | $qx_j$ | $qy_j$ | $qz_j$ | | $db_j$ | $dc_j$ | | $qb_j$ | $qc_j$ | |
| ⋮ | ⋮ | ⋮ | ⋮ | ⋮ | ⋮ | | ⋮ | ⋮ | ⋮ | ⋮ | | ⋮ | ⋮ | | ⋮ | ⋮ | |
| n-1 | $x_{n-1}$ | $y_{n-1}$ | $z_{n-1}$ | $b_{n-1}$ | $c_{n-1}$ | | $d_{n-1}$ | $qx_{n-1}$ | $qy_{n-1}$ | $qz_{n-1}$ | | $db_{n-1}$ | $dc_{n-1}$ | | $qb_{n-1}$ | $qc_{n-1}$ | |
| n | $x_n$ | $y_n$ | $z_n$ | $b_n$ | $c_n$ | | $d_n$ | $qx_n$ | $qy_n$ | $qz_n$ | | $db_n$ | $dc_n$ | | $qb_n$ | $qc_n$ | |

8i

NUMERICAL CONTROL APPARATUS FOR MULTI-AXIAL MACHINE

CROSS REFERENCE TO RELATED APPLICATIONS

This application is a National Stage of International Application No. PCT/JP2012/069015 filed Jul. 26, 2012, the contents of all of which are incorporated herein by reference in their entirety.

FIELD

The present invention relates to a numerical control apparatus.

BACKGROUND

Among machine tools, a machine tool that has three linear axes and two rotation axes is called five-axis machine. A five-axis machine can machine a workpiece into a complicated shape by designating the distal end position of the tool according to the positions of the linear axes and designating a posture of the tool according to the rotation axes.

When a workpiece is machined into an ornamental curved surface, generally, sequence of points of a tool distal end position and the tool posture are typically divided into minute blocks along the curved surface, which is created by a CAD/CAM system or the like. Machining by interpolating in straight lines between the points in the sequence is performed by a numerical control apparatus. In order to smooth the machined surface of the workpiece obtained as a result of machining, the blocks have to be divided more finely. However, if the blocks are finely divided when it is not necessary, the program data volume becomes excessively large in some cases and the arithmetical operation of a program reading and analyzing in the numerical control apparatus takes a long time, which makes it difficult to operate at a predetermining machining speed.

To address the problem, a technique has been proposed in which the sequence of machining points is created without finely dividing the blocks excessively; and the sequence of points is interpolated with curves instead of straight lines by the numerical control apparatus.

Patent Literature 1 describes a numerical control apparatus that performs curve interpolation between for machining points in order to machine a curved surface and changes the inclined angle of the tool with respect to the workpiece. Specifically, a designated sequence of points and a sequence of vectors are read thereinto from a machining program. The numerical control apparatus calculates two interpolating points as actual designated points between points with respect to the read designated sequence of points; creates an approximate curve for the machining points with respect to an actual designated sequence of points using the method of least squares; moves the actual designated points to the approximate curve for machining points to calculate a curve for machining points; performs interpolation on the curve for machining points; and calculates machining points. Alternatively, the numerical control apparatus calculates two interpolating vectors as actual designated vectors for the sequence of read vectors; creates an approximate curve for vector that indicates most distal end point with respect to a distal end sequence of points of the actual designated vector using the method of least squares; moves the actual designated vectors to the approximate curve for the vector indicating the most distal end point in order to calculate a curve for the vector distal end points; performs interpolation for the curve for vector distal end points; and calculates an interpolation vector. The numerical control apparatus calculates a vector showing the direction of movement by using differences between the machining points and machining points of the immediately preceding cycle; calculates a tool distal end center vector from the interpolation vector; and calculates a tool direction vector from the interpolation vector and the traveling direction vector. Further, the numerical control apparatus adds the tool distal end center vector and the tool direction vector to the machining points so as to calculate positions of linear movement axes X, Y, and Z; and calculates the positions of rotation axes A and C from the tool direction vector. Consequently, according to Patent Literature 1, the machining points are smoothly interpolated and the relative relation between the tool and the workpiece smoothly changes. Therefore, a smooth curved surface is obtained.

Patent Literature 2 describes a numerical control apparatus that performs control such that machining points move along a smooth curve and a reference tool length position smoothly changes. Specifically, the numerical control apparatus analyzes a machining program and creates a machining point designated sequence and a tool posture designated sequence. The numerical control apparatus creates a machining point approximate curve with respect to the machining point designated sequence that has been created using the method of least squares; moves the machining point designated sequence toward the machining point approximate curve so as to acquire the machining point curve; performs interpolation along the machining point curve; and calculates an interpolated machining position. Meanwhile, the numerical control apparatus calculates a tool posture unit sequence of vectors from the created tool posture designated sequence; integrates the reference tool length to acquire a reference tool length vector; adds the reference tool length vector to the machining point designated sequence so as to generate a reference tool length position sequence; creates a reference tool length position approximate curve with respect to the reference tool length position sequence using the method of least squares; moves the reference tool length position sequence to the reference tool length position approximate curve so as to calculate a reference tool length position curve; performs interpolation along the reference tool length position curve; and calculates an interpolated reference tool length position. The numerical control apparatus calculates an interpolated tool posture from the interpolated machining position and the interpolated reference tool length position. Further, the numerical control apparatus calculates positions of linear movement axes X, Y, and Z from the interpolated machining position, the interpolated tool posture, and the actual tool length and calculates positions of rotation axes B and C from the interpolated tool posture. Consequently, according to Patent Literature 2, it is possible to perform machining while smoothly changing a tool posture by controlling the linear axes and the rotation axes to attain a calculated tool posture.

CITATION LIST

Patent Literature

Patent Literature 1: Japanese Patent Application Laid-Open No. 2005-182437
Patent Literature 2: Japanese Patent Application Laid-Open No. 2010-146176

SUMMARY

Technical Problem

The technology described in Patent Literature 1 is based on a situation where a curve (a curve for machining points) for smoothly interpolating a tool distal end is generated from a sequence of points of a tool distal end position; and a curve (a curve for vector distal end points) for smoothly interpolating a tool posture is generated from a sequence of points of the tool posture, i.e., the curve of the tool distal ends and the curve of the tool postures are completely separately generated. Consequently, in the technology described in Patent Literature 1, when a moving trajectory of a tool posture vector is taken into account, the tool posture vector sometimes does not smoothly change in synchronization with the smooth movement of the tool distal end along the curve of machining points and it is likely that a machined surface obtained as a result of such machining is not smooth.

In the technology described in Patent Literature 2, a curve (a curve for machining points) for smoothly interpolating a tool distal end is generated from sequence of points of a tool distal end position; a curve (a reference tool length position curve) for smoothly interpolating a reference tool length position that is offset from the tool distal end by a reference tool length is generated from the sequence of points of the tool distal end point position and tool posture position sequences; and, from an interpolated tool posture which connects a point for interpolating the machining point curve and a point for interpolating the reference tool length position, positions of rotation axes B and C at the interpolation points are calculated. Therefore, in the technology described in Patent Literature 2, when a moving trajectory of a tool posture vector is taken into account, for example, even in the case of a program in which a tool posture changes with the movement of only one rotation axis (e.g., the B axis) and the other rotation axis (e.g., the C axis) does not move, in values of the rotation axes calculated from the interpolated tool posture connecting the point for interpolating the machining point curve and the point for interpolating the reference tool length position, a movement component appears in the C axis that originally should not move. In particular, when the movement component is present in the vicinity of a singular point, the C axis largely moves. It is likely that a machined surface obtained as a result of such machining is not smooth.

The present invention has been made in view of the above and it is an objective of the present invention to obtain a numerical control apparatus that can make a moving trajectory of a tool posture vector smooth.

Solution to Problem

To solve the problem and achieve the objective described above, the present invention relates to a numerical control apparatus that numerically controls a machine that has a tool, a linear axis, and a rotation axis on the basis of a machining program that includes a command for a tool distal end position determined by a position of the linear axis and a command for a tool posture determined by a rotation angle of the rotation axis. The numerical control apparatus includes: a program input unit that reads a tool distal end position and a tool posture designated in continuous blocks in the machining program and generates designated position sequences of the linear axis and designated position sequences of the rotation axis; a distal-end-position-curve generating unit that generates, on the basis of the created designated position sequences of the linear axis, a tool distal end position curve concerning the tool distal end position; a tool-posture-curve generating unit that generates, on the basis of the created designated position sequences of the linear axis and the created designated position sequences of the rotation axis, a tool posture curve concerning the tool posture associated with movements of the tool distal end position; an interpolation calculating unit that, at each of interpolation cycles, calculates an interpolation point of the tool distal end position from the tool distal end position curve, calculates an interpolation point of the tool posture from the tool posture curve, and calculates an interpolation point of a machine position of the linear axis in accordance with the interpolation point of the tool distal end position and the interpolation point of the tool posture; and an interpolation output unit that moves the linear axis to the calculated interpolation point of the machine position and moves the rotation axis to the calculated interpolation point of the tool posture.

Advantageous Effects of Invention

According to the present invention, the tool posture curve is derived in association with the linear axis movement of the tool distal end point. Consequently, for example, it is possible to respectively interpolate the linear axis and the rotation axis by combining the tool distal end position curve created on the basis of the linear axis and the tool posture curve created on the basis of both the linear axis and the rotation axis. As a result, it is possible to smoothly move a tool posture vector along with the movement of the tool distal end. That is, it is possible to smooth the moving trajectory of the tool posture vector.

DESCRIPTION OF EMBODIMENTS

Embodiments of a numerical control apparatus according to the present invention are described in detail below with reference to the drawings. Note that the present invention is not limited to the embodiments.

First Embodiment

Figure 1:
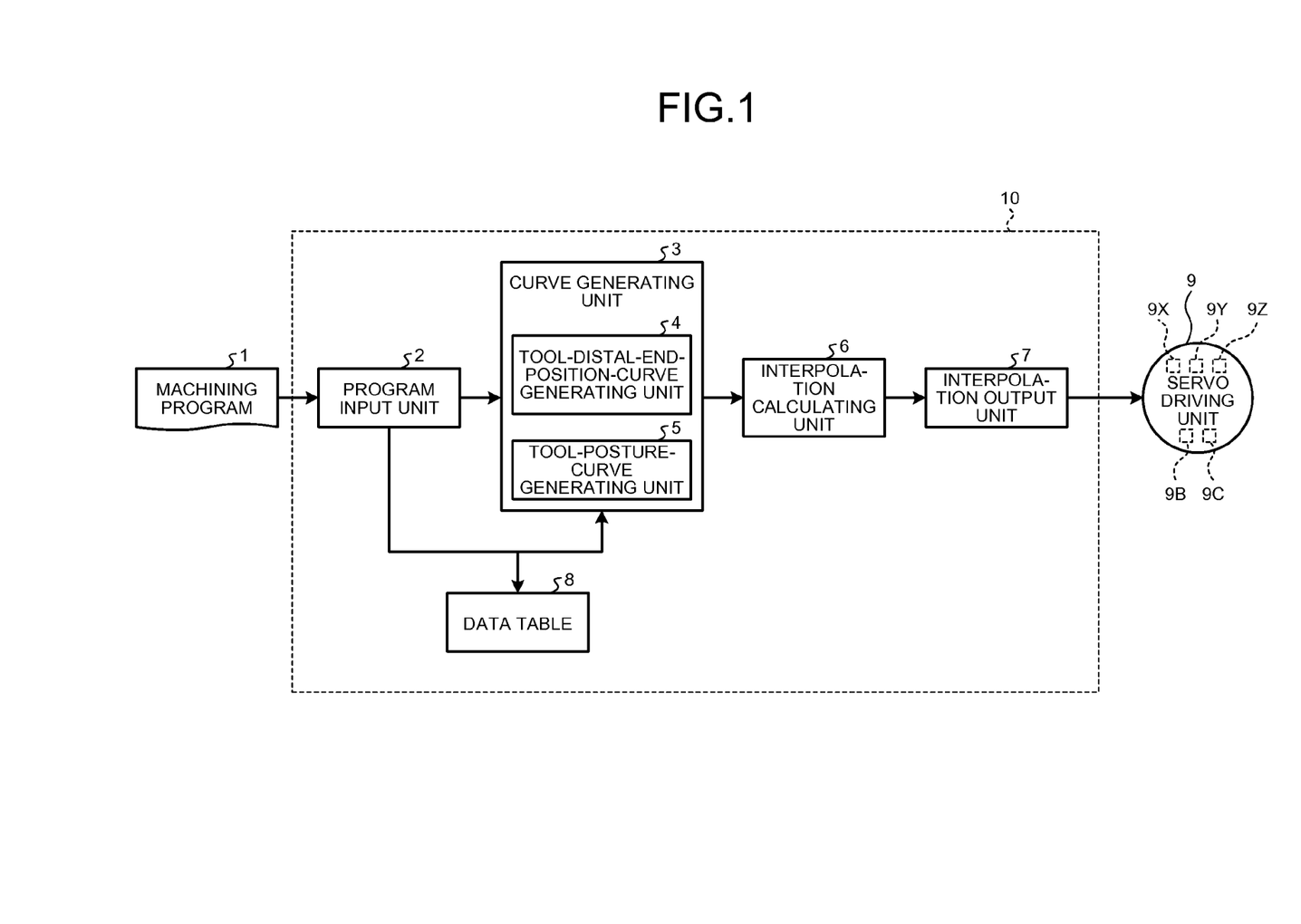
FIG. 1 is a diagram illustrating the configuration of a numerical control apparatus according to a first embodiment.

A numerical control apparatus 10 according to a first embodiment is described with reference to FIG. 1. FIG. 1 is a diagram illustrating the configuration of the numerical control apparatus 10.

Figure 2:
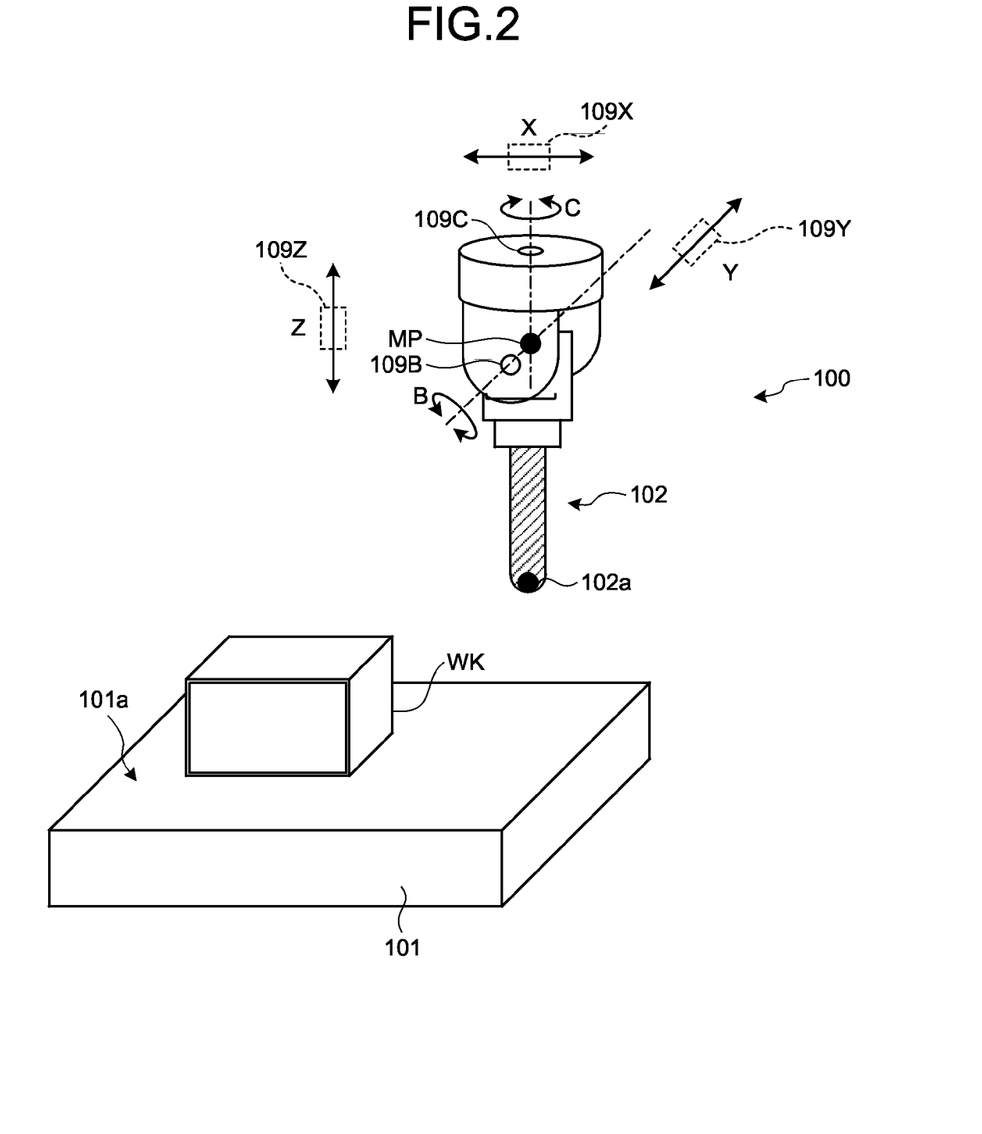
FIG. 2 is a diagram illustrating the configuration of a machine tool according to the first embodiment.

The numerical control apparatus 10 illustrated in FIG. 1 is an apparatus that numerically controls, for example, a machine tool 100 illustrated in FIG. 2 via a servo driving unit 9 and is an apparatus that controls, for example, the distal end position of a tool 102 and the posture of the tool 102. FIG. 2 is a diagram illustrating the configuration of the machine tool 100.

The machine tool 100 provided with the numerical control apparatus 10 performs machining while moving a movable unit by performing control of axes to move to positions designated by a machining program (an NC program or a motion program) 1. The machine tool 100 includes a plurality of linear axes and one or more rotation axes.

Specifically, the machine tool 100 is, for example, as illustrated in FIG. 2, a five-axis machine including an X axis, a Y axis, and a Z axis, which are three linear axes (translation axes); and a B axis and a C axis, which are two rotation axes. The X axis is an axis for an X-axis servo motor 109X to linearly move the tool 102. The Y axis is an axis for a Y-axis servo motor 109Y to linearly move the tool 102. The Z axis is an axis for a Z-axis servo motor 109Z to linearly move the tool 102. The X axis, the Y axis, and the Z axis are, for example, orthogonal to each other. The B axis is an axis for a B-axis servo motor 109B to rotationally move the tool 102. For example, the B-axis servo motor 109B rotationally moves the tool 102 about the Y axis. The C axis is an axis for a C-axis servo motor 109C to rotationally move the tool 102. For example, the C-axis servo motor 109C rotationally moves the tool 102 about the Z axis. A workpiece WK is placed on a principal plane 101a of a table 101. An intersection of a center axis of the B axis and a center axis of the C axis can be regarded as a machine position MP, which indicates the center of the machine tool 100.

Note that FIG. 2 is an exemplary diagram illustrating the configuration of the five-axis machine in which the two rotation axes (the B axis and the C axis) are provided on the tool side. However, the machine tool 100 can be a five-axis machine in which one rotation axis is provided on the tool side and one rotation axis is provided on the workpiece side, or it can be a five-axis machine in which two rotation axes are provided on the workpiece side.

A machining program 1 (see FIG. 6) is a program described using a command code called G code and is a program described using, for example, a tool distal end point control (G43.4/G43.5) command as a simultaneous five-axis control function.

The numerical control apparatus 10 analyzes the machining program 1, controls the machine tool 100 (e.g., the five-axis machine) via the servo driving unit 9 on the basis of the analysis result (see FIG. 2), and performs machining on the workpiece WK while controlling the relative tool posture which is relative to the workpiece WK placed on the table 101. For example, the numerical control apparatus 10 realizes complicated machining for the workpiece WK by appropriately controlling each of the X, Y, Z, B, and C axes so as to set the position and the posture of the tool 102 in a desired tool position and a desired tool posture. For example, the numerical control apparatus 10 outputs predetermined movement commands respectively to an X-axis driving unit 9X, a Y-axis driving unit 9Y, a Z-axis driving unit 9Z, a B-axis driving unit 9B, and a C-axis driving unit 9C in the servo driving unit 9 (see FIG. 1). Thus, the X-axis driving unit 9X, the Y-axis driving unit 9Y, the Z-axis driving unit 9Z, the B-axis driving unit 9B, and the C-axis driving unit 9C respectively output voltage commands to the X-axis servo motor 109X, the Y-axis servo motor 109Y, the Z-axis servo motor 109Z, the B-axis servo motor 109B, and the C-axis servo motor 109C and drive the servo motors.

In this way, the numerical control apparatus 10 can machine the workpiece WK into a more complicated shape by giving a command to the machine tool 100 about a distal end position of the tool 102 for positions on the linear axes and giving a command to the machine tool 100 about postures on the tool 102 for the rotation axes.

When a workpiece WK is machined so as to have an ornamental curve surface, generally, a machining program is made by a CAD/CAM system or the like in order to divide the workpiece WK into minute blocks along the curved surface and to designate a sequence of points of the distal end position 102a of the tool 102 and the posture of the tool 102 in the blocks. In general, machining for interpolating the sequence of points designated by the machining program with straight lines is performed by the numerical control apparatus 10. In this case, in order to smooth a machined surface of the workpiece WK obtained as a machining result, the blocks are set to be more finely divided. However, if the blocks are uselessly divided finely, it is likely that a data volume of the machining program becomes excessively large and an calculating operation for a program reading analysis of the numerical control apparatus takes time, resulting in making it difficult to realize predetermining machining speed.

For addressing this, a technique is devised to create sequences of machining points without excessively finely dividing blocks and interpolate the sequence of points with curves and not using straight lines by the numerical control apparatus 10. In the case of the machining program for designating the sequence of points of the distal end position 102a of the tool 102 and the posture of the tool 102, it is necessary to, while smoothly interpolating movements of the linear axis corresponding to the distal end position 102a of the tool 102, smoothly interpolate, with a curve, movements (rotation) of the rotation axis corresponding to the posture of the tool 102 in synchronization with the movement of the linear axis. A technique for realizing this interpolation is needed.

Therefore, in the first embodiment, a tool distal end position curve associated with the distal end position 102a of the tool 102 is generated on the basis of sequence of points of designated positions of the linear axes and, at the same time, a tool posture curve associated with the posture of the tool 102 is generated on the basis of not only sequence of points of designated positions of the rotation axes but also the sequence of points of the designated positions of the linear axes to aim at, while smoothing a moving trajectory of the tool distal end 102a, and smoothing a moving trajectory of a tool posture vector indicating the posture of the tool 102 in synchronization with the movement of the tool distal end 102a.

That is, the numerical control apparatus 10 according to the first embodiment includes, for example, a program input unit, a distal-end-position-curve generating unit, a tool-posture-curve generating unit, an interpolation calculating unit, and an interpolation output unit.

The program input unit reads a distal end position and a posture of a tool designated by continuous blocks in a machining program and generates designated position sequences of linear axes and designated position sequences of rotation axes. The tool-distal-end-position-curve generating unit generates a tool distal end position curve on the basis of the designated position sequences of the linear axes created by the program input unit. The tool distal end position curve is a curve concerning the distal end position 102a of the tool 102 and is, for example, a smooth curve. The tool-posture-curve generating unit generates a tool posture curve on the basis of the designated position sequences of the linear axes created by the program input unit and the designated position sequences of the rotation axes created by the program input unit. The tool posture curve is a curve associated with the movement of the distal end position 102a of the tool 102, is a curve concerning the posture of the tool 102, and is, for example, a smooth curve. The interpolation calculating unit calculates, at each interpolation cycle, interpolation points of the distal end position 102a of the tool 102 from the tool distal end position curve. The interpolation calculating unit calculates, at the interpolation cycles, interpolation points of the posture of the tool 102 from the tool posture curve. The interpolation calculating unit calculates, at each interpolation cycle, interpolation points of the machine position MP of the linear axes on the basis of the interpolation points of the distal end position 102a of the tool 102 and the interpolation points of the posture of the tool 102. The interpolation output unit moves the linear axes to the interpolation points of the machine position MP calculated by the interpolation calculating unit. The interpolation output unit moves (rotates) the rotation axes to the interpolation points of the posture of the tool 102 calculated by the interpolation calculating unit.

The first embodiment, among the components, features, for example, the tool-distal-end-position-curve generating unit and the tool-posture-curve generating unit, of which concepts are thus first to be described in the first embodiment.

Figure 3:
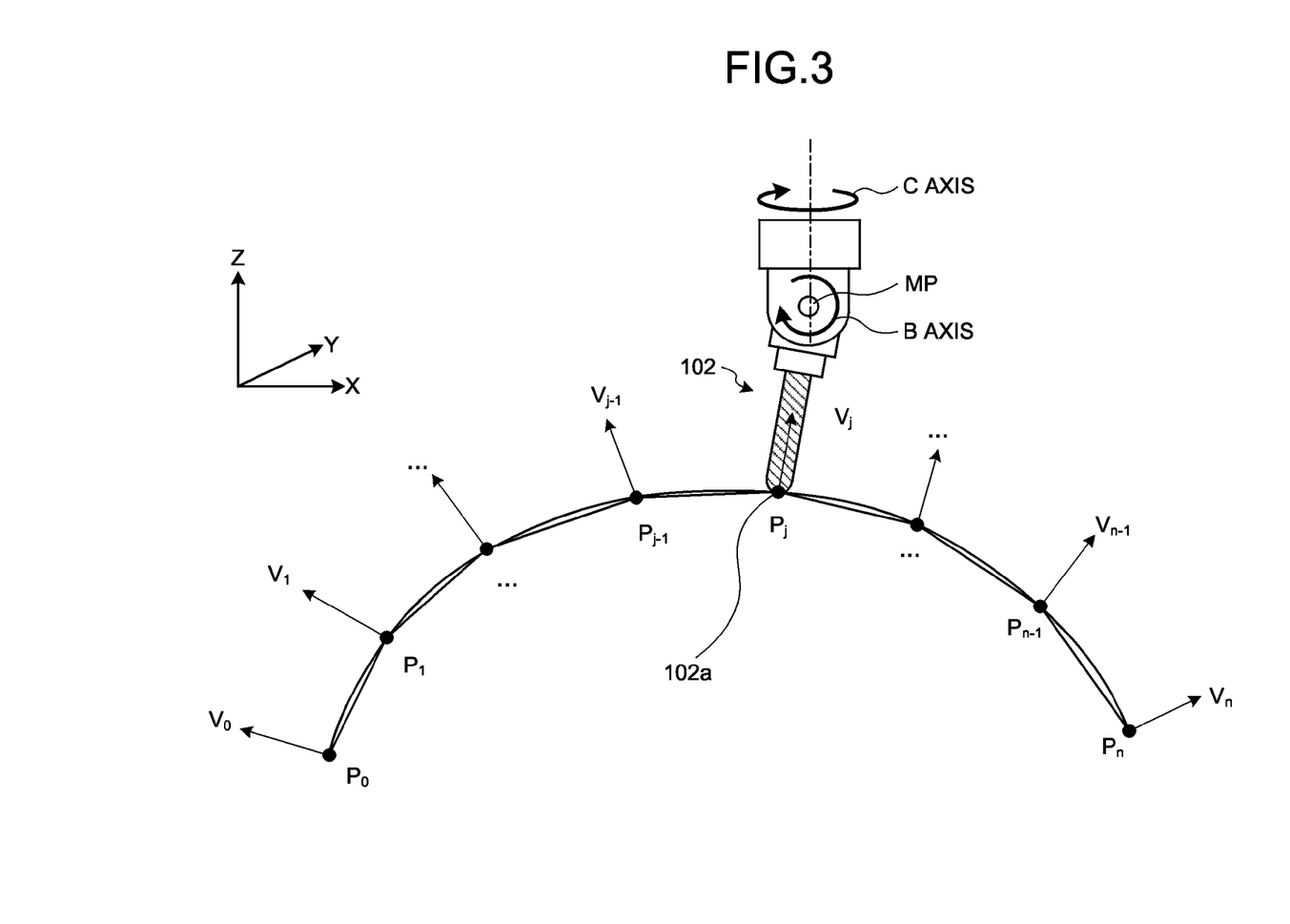
FIG. 3 is a diagram illustrating a tool distal end point and a tool posture in the first embodiment.
Figure 4:
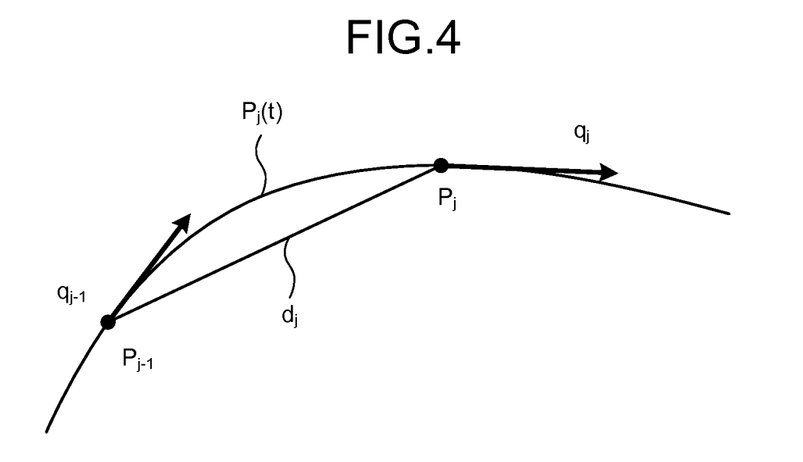
FIG. 4 is a diagram illustrating a spline curve in one section in the first embodiment.

According to a publicly-known curve theory (e.g., "Shape Processing Engineering (I)", Fujio Yamaguchi, published by Nikkan Kogyo Shinbun, Ltd.), points on a cubic spline curve smoothly passing n+1 designated points $P_0, P_1, P_2, \ldots,$ and $P_n$ illustrated in FIG. 3 are represented by the following Formula (1) in, for example, a section illustrated in FIG. 4 at the designated points $P_{j-1}$ to $P_j$:

[Math. 1]

$$P_j(t) = [t^3 \; t^2 \; t \; 1] \begin{bmatrix} 3 & -2 & 1 & 1 \\ -3 & 3 & -2 & -1 \\ 0 & 0 & 1 & 0 \\ 1 & 0 & 0 & 0 \end{bmatrix} \begin{bmatrix} P_{j-1} \\ P_j \\ d_j q_{j-1} \\ d_j q_j \end{bmatrix} \quad (1)$$

$(j=1,2,3,\ldots,n)$

In Formula (1), $q_j$ represents a unit tangent vector of a cubic spline curve at a designated point $P_j(x_j, y_j, z_j)$; and $d_j$ represents a distance from $P_{j-1}$ to $P_j$ and is represented by, for example, the following Formula (2):

$$d_j = \sqrt{\{(x_j-x_{j-1})^2+(y_j-y_{j-1})^2+(z_j-z_{j-1})^2\}} \quad (2)$$

In the above Formula (1), t represents a parameter of a curve and is a value within a range of $0 \le t \le 1$. The spline curve indicated by using Formula (1) passes the designated point $P_j$. However, unless the unit tangent vector $q_j$ is appropriately set, the second derivative is not continuous at the designated points. A condition under which the second derivative is continuous at the designated points is represented by the following Formula (3):

$$d_j q_{j-1}+2(d_{j+1}+d_j)q_j+d_j q_{j+1}=(3/d_j d_{j+1})(d_j^2(P_{j+1}-P_j)+d_{j+1}^2(P_j-P_{j-1})) \; (j=1,2,3,\ldots, \text{and } n) \quad (3)$$

Note that, for the end points $P_0$ and $P_n$, a curvature at the end points is set to 0; and an end point condition indicated by the following Formulas (4a) and (4b) is added:

$$2d_2 q_1+d_2 q_3=3(P_2-P_1) \quad (4a)$$

$$d_n q_{n-1}+2d_n q_n=3(P_n-P_{n-1}) \quad (4b)$$

If n+1 tangent vectors $q_j$ can be calculated by solving n+1 simultaneous equations of Formulas (3), (4a), and (4b), a spline curve in the entire section can be calculated by using Formula (1).

In the solution, when the spline curve of Formula (1) is decomposed into components of the linear axes (the X axis, the Y axis, and the Z axis), the spline curve is represented by the following Formula (5):

$$P_j(t)=[Px_j(t),Py_j(t),Pz_j(t)] \quad (5)$$

Formulas (3), (4a), and (4b) are formulas independent from one another for each axis components of the linear axes having, as a common term, $d_j$ of Formula (2) indicating the distance between the designated points. Spline curves are independently calculated associated with the linear axes.

Combination of a linear axis and a rotation axis is then examined. As illustrated in FIG. 3, it is set that a tool posture vector $V_j$ indicating a posture of the tool 102 at a point $P_j$ is given by an angle of the B axis and the C axis, which are the two rotation axes. A distance between points in a five-dimensional space is defined by the following Formula (6) with respect to designated sequence of points $P_j(x_j, y_j, z_j)$ of a linear axis and designated sequence of points $V_j(b_j, c_j)$ of an angle representing the posture of the tool 102:

$$d_j'=\sqrt{\{(x_j-x_{j-1})^2+(y_j-y_{j-1})^2+(z_j-z_{j-1})^2+(b_j-b_{j-1})^2+(c_j-c_{j-1})^2\}} \quad (6)$$

In Formula (6), a difference in a dimension between the length of the linear axis and the angle of the rotation axis is adjusted by converting the length and the angle as 1°=1 mm.

In this case, Formulas (1), (3), (4a), and (4b) are defined with respect to axis components of the X axis, the Y axis, the Z axis, the B axis, and the C axis by setting the distance $d_j$ between the sequence of points as $d_j'$ of Formula (6). The spline curve of Formula (1) can be decomposed into components of each of the axes and calculated as indicated by the following Formula (7):

$$P_j(t)=[Px_j(t),Py_j(t),Pz_j(t),Pb_j(t),Pc_j(t)] \quad (7)$$

However, the components $Px_j(t)$, $Py_j(t)$, and $Pz_j(t)$ of x, y, and z of Formula (7) are different from the components $Px_j(t)$, $Py_j(t)$, and $Pz_j(t)$ of x, y, z of Formula (5).

Here, an integrated value L of a moving distance of the tool distal end 102a is considered and regarded as one axis, and l is put as shown in Formula (8) as a component of the integrated value L:

$$l_j = l_{j-1} + d \quad (8)$$

Figure 5:
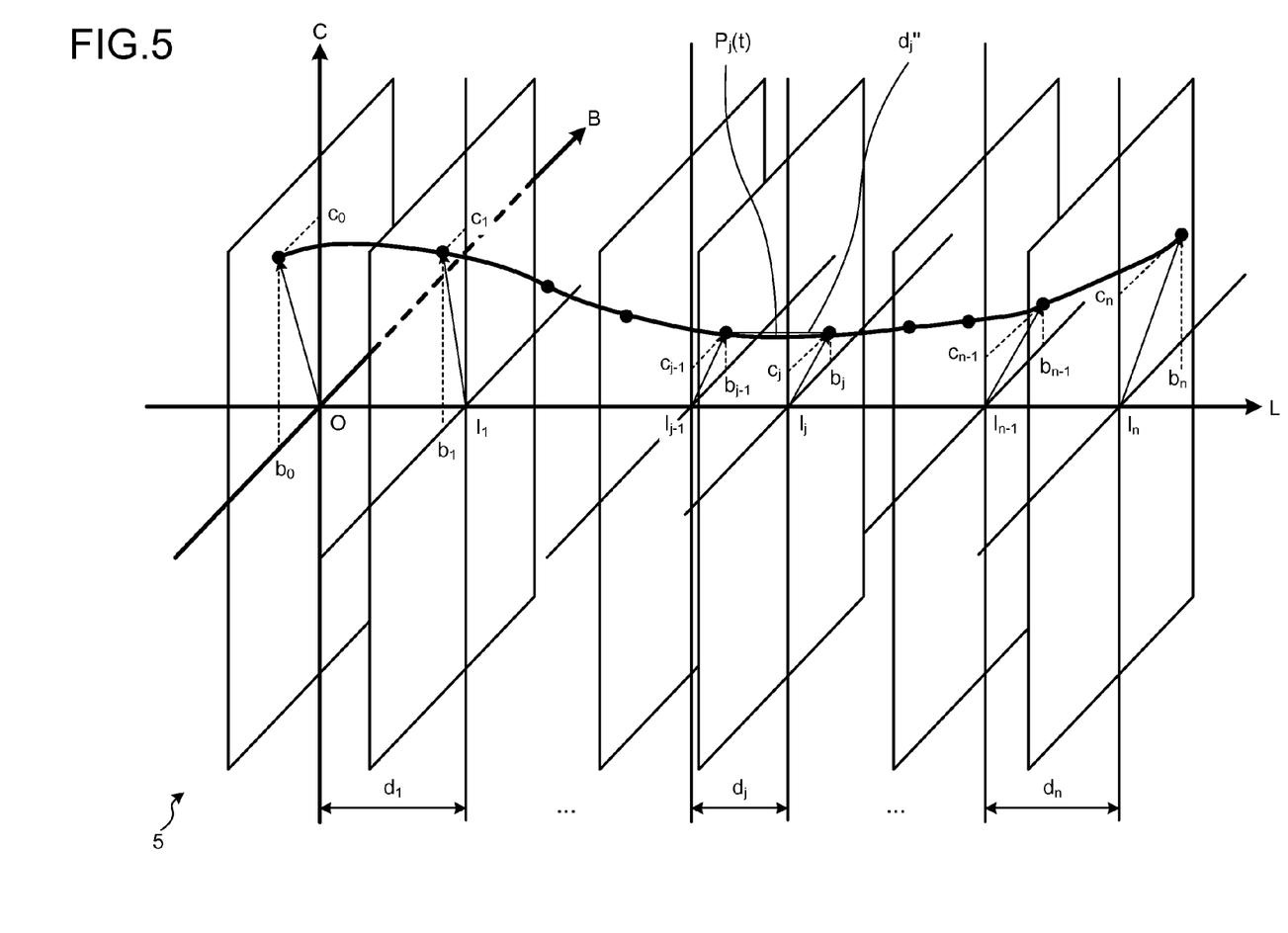
FIG. 5 is a diagram illustrating a curve obtained by combining a linear axis and two rotation axes in the first embodiment.

In this case, a three-dimensional space of L-B-C is considered as illustrated in FIG. 5 and a curve represented by the following Formula (9) is considered as a spline curve smoothly passing within the L-B-C space:

$$P_j(t) = [Pl_j(t), Pb_j(t), Pc_j(t)] \quad (9)$$

In this case, a distance $d_j''$ between the sequence of points is represented as indicated by the following Formula (10):

$$d_j'' = \sqrt{\{(l_j - l_{j-1})^2 + (b_j - b_{j-1})^2 + (c_j - c_{j-1})^2\}} \quad (10)$$

In Formula (10), the following Formula (11) clearly holds:

$$(l_j - l_{j-1})^2 = (x_j - x_{j-1})^2 + (y_j - y_{j-1})^2 + (z_j - z_{j-1})^2 \quad (11)$$

According to Formula (6), (10), and (11), it is seen that $d_j' = d_j''$ holds. Consequently, the components Pb(t) and Pc(t) of the B axis and the C axis of the spline curve calculated by using Formula (7) coincide with components of the B axis and the C axis of the spline curve calculated by using Formula (9). That is, Pb(t) and Pc(t) of the spline curve calculated by using Formula (7) can be regarded as an equation for curve that smoothly changes in synchronization with the movement of the linear axis between the designated sequences of points.

Consequently, if the components Px(t), Py(t), and Pz(t) of the liner axis of the spline curve calculated from Formula (5) and the components Pb(t) and Pc(t) of the rotation axis of the spline curve calculated from Formula (7) are combined as $P_j(t) = [Px_j(t), Py_j(t), Pz_j(t), Pb_j(t), Pc_j(t)]$, while smoothly moving the linear axes X, Y, and Z with this curve, this curve can make a curve on which the rotation axes B and C smoothly move in synchronization with the movement.

Thus, in the first embodiment, for example, the tool-distal-end-position-curve generating unit calculates the spline curve by using Formula (5) from the sequence of points of the position designates of the linear axes; the tool-posture-curve generating unit generates the tool posture curve by using Formula (7) on the basis of combined axes of the linear axes and the rotation axes from the sequence of points of the designated positions of the linear axes and the rotation axes.

Specifically, as illustrated in FIG. 1, the numerical control apparatus 10 includes a program input unit 2, a curve generating unit 3, an interpolation calculating unit 6, and an interpolation output unit 7. Reference numeral 9 denotes a servo driving unit that drives a not-illustrated motor on the basis of a position designate at every sampling time; reference numeral 8 denotes a data table in which data for curve generation processing is stored. The curve generating unit 3 includes a tool-distal-end-position-curve generating unit 4 and a tool-posture-curve generating unit 5.

The program input unit 2 reads the machining program 1. The curve generating unit 3 generates, from the machining program 1 read by the program input unit 2, a curve that smoothly connects designated sequence of points of the machining program 1. For example, the tool-distal-end-position-curve generating unit 4 of the curve generating unit 3 generates a curve that smoothly connects designated positions of the tool distal end. The tool-posture-curve generating unit 5 of the curve generating unit 3 generates a curve that smoothly connects designated angles of the posture of the tool. The interpolation calculating unit 6 calculates an interpolated position at every sampling time along the curve generated by the curve generating unit 3. The interpolation output unit 7 outputs the interpolated position calculated at every sampling time to the servo driving unit 9 as a position designate.

Figure 6:
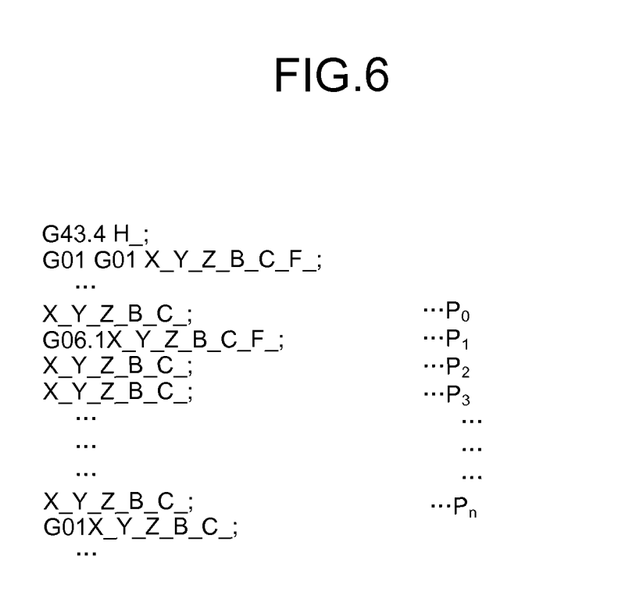
FIG. 6 is a diagram illustrating the content of a machining program in the first embodiment.

The machining program 1 includes, for example, contents specified as illustrated in FIG. 6. "G43.4" represents tool distal end point control and indicates that coordinate values of X, Y, and Z described in rows below "G43.4" are coordinates of the distal end position 102a of the tool 102 illustrated in FIG. 3. "G01" represents linear interpolation and indicates that the distal end position 102a linearly moves to coordinate values of axes designated in each of the blocks. A G code for designating movement along a smooth curve is prepared as "G06.1". In a place where curve interpolation is desired, "G06.1" is designated by the machining program 1. Points where the curve passes thereafter are designated by the program as coordinate values of the axes. When the curve interpolation ends and when another interpolation mode such as linear interpolation of "G01" is designated by the program, the curve interpolation is cancelled at that point. In the machining program 1 illustrated in FIG. 6, the end point P0 of the last linear interpolation before "G06.1" is designated is set as a start point of a curve. P1, P2, P3, . . . , and Pn are programmed as passing points of the curve interpolation, the curve interpolation changes to another interpolation mode in "G01", and the curve interpolation ends.

Note that the curve interpolation is cancelled by "G01" next to Pn. However, the curve interpolation can be cancelled by other "G0" (fast forward), "G2/G3" (circular interpolation), and the like. By designating "G06.1", a new curve starting from Pn can be set as a program designate. It is also possible to allocate a special G code for explicitly cancelling the curve interpolation.

The program input unit 2 reads the machining program 1 line by line. When identifying a G code (in this embodiment, "G06.1") indicating the curve interpolation, the program input unit 2 reads the machining program 1 until a series of curve interpolation is cancelled and sets data in the data table 8. Contents of the data table 8 are illustrated in FIG. 7.

The data set in the data table 8 are coordinate values of the axes X, Y, Z, B, and C at (n+1) points from $P_0$ to $P_n$ and distances $d_j$ and $d_j'$ between two points. $d_j$ represents a distance from $P_{j-1}$ to $P_j$ and is represented by the above Formula (2). $d_j'$ represents an inter-point distance of a five-dimensional space in which five axes, i.e., three linear axes and two rotation axes, are combined with respect to designated sequence of points $P_j(x_j, y_j, z_j)$ of a linear axis and designated sequence of points $V_j(b_j, c_j)$ of an angle representing a tool posture. The inter-point distance $d_j'$ is represented by the above Formula (6). A difference in a dimension of the length of the linear axis and the angle of the rotation axis is adjusted by, for example, converting the length and the angle as 1°=1 mm.

Figure 7:
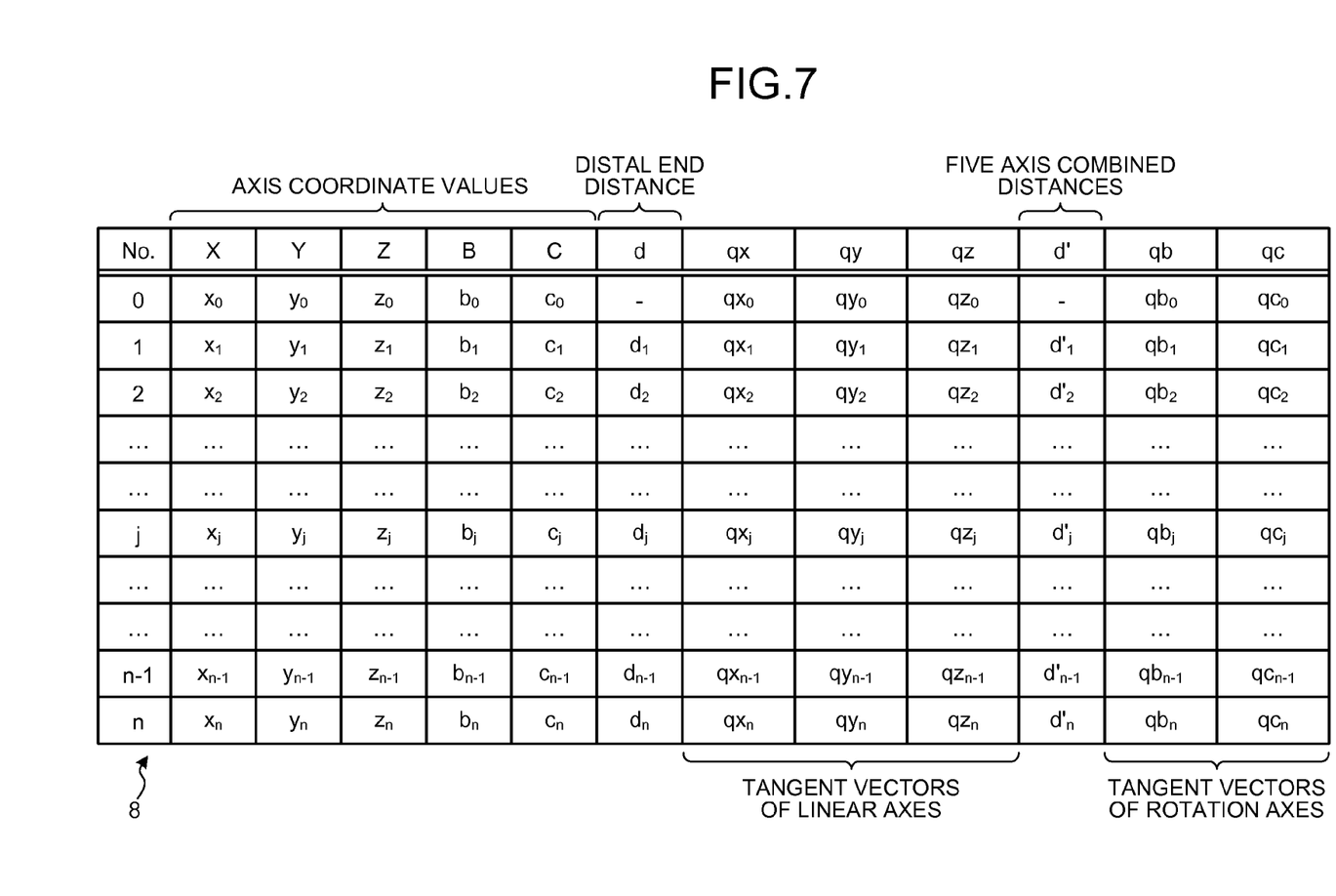
FIG. 7 is a diagram illustrating the configuration of a data table in the first embodiment.

For example, when the data table 8 illustrated as in FIG. 7 is created, the program input unit 2 illustrated in FIG. 1 starts the curve generating unit 3.

In the curve generating unit 3, first, the tool-distal-end-position-curve generating unit 4 generates, from the data table 8, a curve equation that smoothly passes the tool distal end points. As a procedure of the generation, from a coordinate value $P_j = (X_j, Y_j, Z_j)$ of the tool distal end and the distance $d_j$ that is between the designated sequence of points of the tool distal end points, when a tangent vector $q_j$ at designated points Pi is represented as $q_j = (qx_j, qy_j, qz_j)$, the tool-distal-end-position-curve generating unit 4 solves the (n+1) simultaneous equations concerning each of X, Y, and Z according to the above Formula (3) in which second derivative of a curve line is continuous, and Formulas (4a) and (4b) which make the end point conditions under which curvatures are 0 at the start point $P_0$ and the end point $P_n$ of the curve. Consequently, the (n+1) tangent vectors $q_j=(qx_j, qy_j, qz_j)$ (n=0, 1, . . . , and n) are calculated. The calculated result is stored in the data table as, for example, tangent vectors (see FIG. 7) of the linear axes.

Subsequently, the tool-posture-curve generating unit 5 generates, from the data table 8, a curve equation in which the tool postures smoothly change while passing through designated points. As a procedure of the generation, when designated points $P_j$ consisting of coordinate values of the tool distal end and coordinate values of the tool posture are represented as $P_j=(X_j, Y_j, Z_j, B_j, C_j)$, a distance $d_j'$ between designated sequence of points obtained by combining three linear axes and two rotation axes is set to $d_j$ (see Formula 6 and FIG. 5), and tangent vectors at the designated points $P_j$ are represented as $q_j=(qx_j, qy_j, qz_j, qb_j, qc_j)$, from the above Formula (3) in which second derivative of a curve line is continuous and Formulas (4a) and (4b) making end point conditions under which curvatures are 0 at the start point $P_0$ and the end point $P_n$ of the curve, the tool-posture-curve generating unit 5 calculates (n+1) tangent vectors $q_j'=(qb_j, qc_j)$ (n=0, 1, . . . , and n) from the (n+1) simultaneous equations concerning each of only components of the two rotation axes, i.e., the B axis and the C axis. The calculated results are stored in the data table 8 as, for example, tangent vectors (see FIG. 7) of the rotation axes.

In this way, components of axes of tangent vectors of a smooth curve are derived.

Subsequently, a formula of a cubic spline function is put as indicated by the following Formula (16):

$$f(t)=At^3+Bt^2+Ct+D \ (0 \le t \le 1) \tag{16}$$

When Formula (16) is first-order differentiated, Formula (17) is obtained.

$$f'(t)=3At^2+2Bt+C \tag{17}$$

By using Formula (16), a coordinate value of a start point of the curve is as indicated by the following Formula (18a):

$$f(0)=D \tag{18a}$$

From Formula (16), a coordinate value of an end point of the curve is as indicated by the following Formula (18b):

$$f(1)=A+B+C+D \tag{18b}$$

From Formula (17), a component of a tangent vector at the start point of the curve is as indicated by the following Formula (18c):

$$f'(0)=C \tag{18c}$$

From Formula (17), a component of a tangent vector at the end point of the curve is as indicated by the following Formula (18d):

$$f'(1)=3A+2B+C \tag{18d}$$

In the data table 8, coordinate values of the points and angle axis components of the tangent vectors are calculated. Therefore, cubic spline functions of the axes in n sections are derived by using the coordinate values and the angle axis components.

$$f_{jx}(t)=A_x t^3+B_x t^2+C_x t+D_x \ (j=0,1, \ldots, \text{ and } n) \tag{19a}$$

$$f_{jy}(t)=A_y t^3+B_y t^2+C_y t+D_y \ (j=0,1, \ldots, \text{ and } n) \tag{19b}$$

$$f_{jz}(t)=A_z t^3+B_z t^2+C_z t+D_z \ (j=0,1, \ldots, \text{ and } n) \tag{19c}$$

$$f_{jb}(t)=A_b t^3+B_b t^2+C_b t+D_b \ (j=0,1, \ldots, \text{ and } n) \tag{19d}$$

$$f_{jc}(t)=A_c t^3+B_c t^2+C_c t+D_c \ (j=0,1, \ldots, \text{ and } n) \tag{19e}$$

When the curve generating unit 3 derives curve equations of the axes in all the sections, the interpolation calculating unit 6 performs interpolation processing according to a fixed sampling cycle.

The interpolation processing is performed according to a procedure described below. First, when a distance $\Delta L$ (mm) in movement in a fixed sampling time $\Delta T$ (second) is calculated with respect to a moving speed designated F (mm/min.) of the tool distal end described in the program 1, Formula (20) is obtained:

$$\Delta L = F/60 \times \Delta T \ (\text{mm}) \tag{20}$$

In Formula (20), F is set as fixed program designate speed. However, when predetermined acceleration and deceleration are added, speed subjected to the acceleration and deceleration can be set as F.

Figure 8:
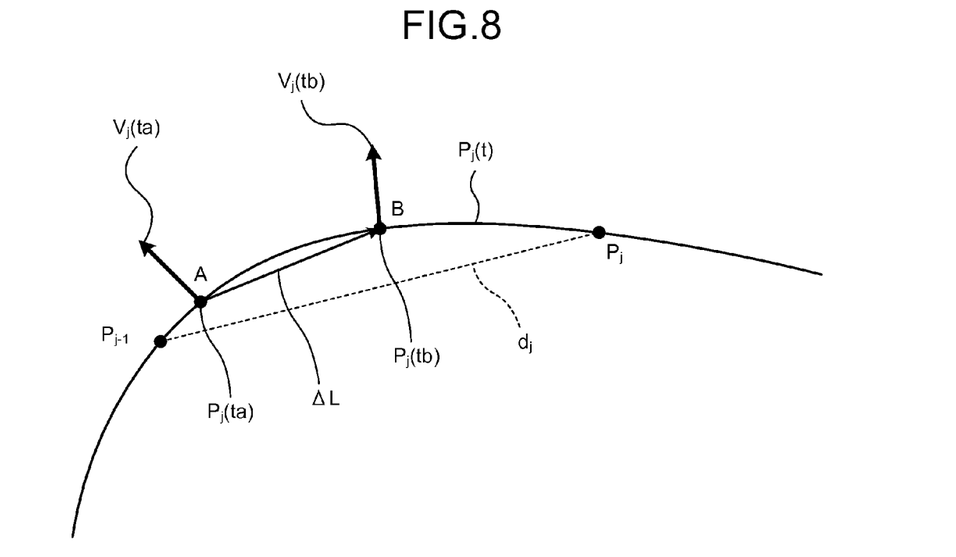
FIG. 8 is a diagram illustrating interpolation points on a curve in the first embodiment.

Subsequently, the position advanced by $\Delta L$ on the curve from the present position is to be calculated. In FIG. 8, assuming that the present position is at a position $A=P_j(ta)$ that is given by t=ta on the curve line $P_j(t)$, a position B advanced by $\Delta$ from the present position is to be calculated. To calculate the position B, it is only needed to obtain a parameter tb of the curve for giving a position $B=P_j(tb)$ on the curve. A start point of the curve $P_j(t)$ is $P_{j-1}=P_j(0)$, an end point of the curve $P_j(t)$ is $P_j=P_j(1)$, and a distance from $P_{j-1}$ to $P_j$ is $d_j$. Therefore, when the parameter t on the curve changes from 0 to 1, the tool distal end moves on the curve $P_j(t)$ by the distance $d_j$. Therefore, in order to move the tool distal end by $\Delta L$ on the curve, first, the parameter t is changed by $\Delta t=\Delta L/d_j$. Consequently, $P_j(tb)$ is calculated by the following Formula (21):

$$tb=ta+\Delta L \tag{21}$$

By the following Formula (22), a distance Leng that the tool distal end actually moves from $P_j(ta)$ is calculated.

$$\text{Leng}=|P_j(ta)-P_j(tb)| \tag{22}$$

When a difference between the distance Leng of the actual movement indicated by Formula (22) and $\Delta L$ is equal to or larger than an allowable value, $\Delta t$ is corrected as $\Delta t = \Delta t \times \Delta L/\text{Leng}$, tb of Formula (21) is corrected by using corrected $\Delta t$, and $P_j(tb)$ is calculated again. This calculation is repeated until the difference between the distance Leng of the actual movement from $P_j(ta)$ to $P_j(tb)$ and $\Delta L$ decreases to be equal to or smaller than the allowable value.

After calculating a point $B=P_j(tb)=(f_j x(tb), f_j y(tb), f_j z(tb))$ to which the tool distal end moves from the point A by $\Delta L$ on the curve, the curve parameter tb is substituted in the curve equation (see Formulas (19d) and (19e)) of the tool posture and a tool posture curve $V_j(tb)=(f_j b(tb), f_j c(tb))$ corresponding to the point $P_j(tb)$ is calculated. The tool posture curve $V_j(t)$ is calculated so as to be associated with the movement of the tool distal end on the curve $P_j(t)$. Therefore, by giving a parameter t, which is same as the curve parameter t for giving the position of the tool distal end, to the tool posture curve equation to calculate a posture of the tool distal end, it is possible to calculate a position where the tool posture is smoothly moved in association with a smooth movement of the tool distal end.

When the positions of the axes X, Y, Z, B, and C moving on the curve at every sampling cycle are calculated as described above, the interpolation calculating unit 6 calculates the machine position MP illustrated in FIG. 3 by the values of the positions X, Y, and Z of the tool distal end and the tool postures B, C and gives a command the values of the axes, i.e., the machine positions X, Y, and Z and the angles B and C of the tool posture, to the servo driving unit 9. The servo driving unit 9 drives the servo motors of the axes to attain designated positions.

Note that, during the description of the processing, the present position is described as $A=P_j(ta)$. However, when the processing for interpolating the curve starts for the first time, $j=0$ and $ta=0$. That is, $A=P_0(0)$, which is a start point of a series of curves.

When the remaining distance from the point A to the curve end point $P_j(1)$ of the section is smaller than $\Delta L$, it is sufficient to set a value obtained by subtracting the remaining distance from $\Delta L$ to be as $\Delta L'$; calculate $\Delta L'$ from the following Formula (23); set the point A as a start point $P_{j+1}(0)$ of the next curve $P_{j+1}(t)$; and calculate a position $P_{j+1}(tb)$ to which the tool distal end moves by $\Delta L'$ on $P_{j+1}(t)$.

$$\Delta L'=\Delta L-|P_j(ta)-P_j(1)| \qquad (23)$$

Through the process described above, it is possible to interpolate the tool distal end position along the smooth curve that passes the distal end position designated by the program and is possible to obtain an interpolation result for smoothly changing the two rotation axes giving the tool posture in synchronization with the movement of the tool distal end while passing a posture designated in the machining program. That is, it is possible to smooth a moving trajectory of the tool posture vector V.

As described above, in the first embodiment, in the numerical control apparatus 10, the tool-distal-end-position-curve generating unit 4 generates, on the basis of the designated position sequences of the linear axes created by the program input unit 2, a tool distal end position curve (e.g., Formulas (19a), (19b), and (19c)) concerning the tool distal end position. The tool-posture-curve generating unit 5 generates, on the basis of the designated position sequences of the linear axes created by the program input unit 2 and the designated position sequences of the rotation axes created by the program input unit 2, a tool posture curve (e.g., Formulas (19d) and (19e)) concerning the tool posture associated with the movement of the tool distal end position. The interpolation calculating unit 6 calculates an interpolation point of the distal end position 102a of the tool 102 from the tool distal end position curve generated by the tool-distal-end-position-curve generating unit 4; calculates an interpolation point of the posture of the tool 102 from the tool posture curve generated by the tool-posture-curve generating unit 5; and calculates an interpolation point of the machine position MP of the linear axis on the basis of the interpolation point of the distal end position 102a of the tool 102 and the interpolation point of the posture of the tool 102. The interpolation output unit 7 moves the linear axis to the interpolation point of the machine position calculated by the interpolation calculating unit 6 and moves the rotation axis to the interpolation point of the tool posture calculated by the interpolation calculating unit 6. Consequently, the tool posture curve is derived in association with the linear axis movement of the tool distal end point. Therefore, for example, it is possible to combine the tool distal end position curve created on the basis of the linear axis and the tool posture curve created on the basis of both of the linear axis and the rotation axis, and is possible to respectively interpolate the linear axis and the rotation axis. As a result, it is possible to smoothly move a tool posture vector in accordance with the movement of the tool distal end. That is, it is possible to smooth a moving trajectory of the tool posture vector.

In the first embodiment, the tool-posture-curve generating unit 5 generates a tool posture curve using the combined axes of the linear axis and the rotation axis. For example, in the five-dimensional space in which the three linear axes and the two rotation axes are combined, the tool-posture-curve generating unit 5 calculates tangent vectors of the two rotation axes such that the second derivative values of the curve are continuous at the designated points consisting of coordinate values of the tool distal end and coordinate values of the tool posture, so as to acquire the curve formula indicating the tool posture curve by using the second derivatives of the tangent vectors of two rotational axis. Consequently, it is possible to create the tool posture curve on the basis of both of the designated position sequences of the linear lines and the designated position sequences of the rotation axes. It is possible to associate the tool posture curve with the movement of the tool distal end position. As a result, it is possible to interpolate the tool distal end position along a smooth curve passing through the distal end position designated by the machining program and is possible to obtain an interpolation result for smoothly changing the two rotation axes for giving the tool posture in synchronization with the movement of the tool distal end while passing the postures designated by the machining program.

Second Embodiment

A numerical control apparatus 10i according to a second embodiment is described. In the following description, differences from the first embodiment are mainly described.

In the first embodiment, the tool posture curve is generated using, for example, the five combined axes obtained by combining the three linear axes and the two rotation axes. However, in the second embodiment, rotations axes are combined with one linear axe one by one.

First, a concept in the second embodiment is described. For example, in the following illustrative description, two rotation axes are combined with three linear axes one by one.

Distances between the points in a four-dimensional space are defined by the following Formulas (12a) and (12b) with respect to designated sequence of points $P_j(x_j, y_j, z_j)$ of a linear axis and designated sequence of points $V_j(b_j, c_j)$ of an angle representing a tool posture.

$$db_j=\sqrt{\{(x_j-x_{j-1})^2+(y_j-y_{j-1})^2+(z_j-z_{j-1})^2+(b_j-b_{j-1})^2\}} \qquad (12a)$$

$$dc_j=\sqrt{\{(x_j-x_{j-1})^2+(y_j-y_{j-1})^2+(z_j-z_{j-1})^2+(c_j-c_{j-1})^2\}} \qquad (12b)$$

In Formula (12a), $db_j$ represents an inter-point distance in a four-dimensional space in which the B axis of the rotation axes is combined with the linear axes x, y, and z. In Formula (12b), $dc_j$ represents an inter-point distance in a four-dimensional space in which the C axis of the rotation axes is combined with the linear axes x, y, and z. A difference in a dimension between the length of the linear axis and the angle of the rotation axis is adjusted by, for example, converting the length and the angle as 1°=1 mm.

In this case, the above Formulas (1), (3), (4a), and (4b) are defined for each of the axis components of x, y, z, and b by setting the distance $d_j$ between the sequence of points to $db_j$ of Formula (12a). The spline curve of Formula (1) can be decomposed into components of the axes and calculated as indicated by the following formula (13a):

$$P_j(t)=[Px_j(t),Py_j(t),Pz_j(t),Pb_j(t)] \qquad (13a)$$

The components $Px_j(t)$, $Py_j(t)$, and $Pz_j(t)$ of X, Y, and Z of Formula (13a) are different from $Px_j(t)$, $Py_j(t)$, and $Pz_j(t)$ of Formulas (5) and (7). The component $Pb_j(t)$ of B of Formula (13a) is different from $Pb_j(t)$ of Formula (7).

The component 1 obtained in a situation where the integrated value L of the moving distance of the tool distal end is considered so as to regard as one axis is illustrated in the above Formula (8).

Figure 9:
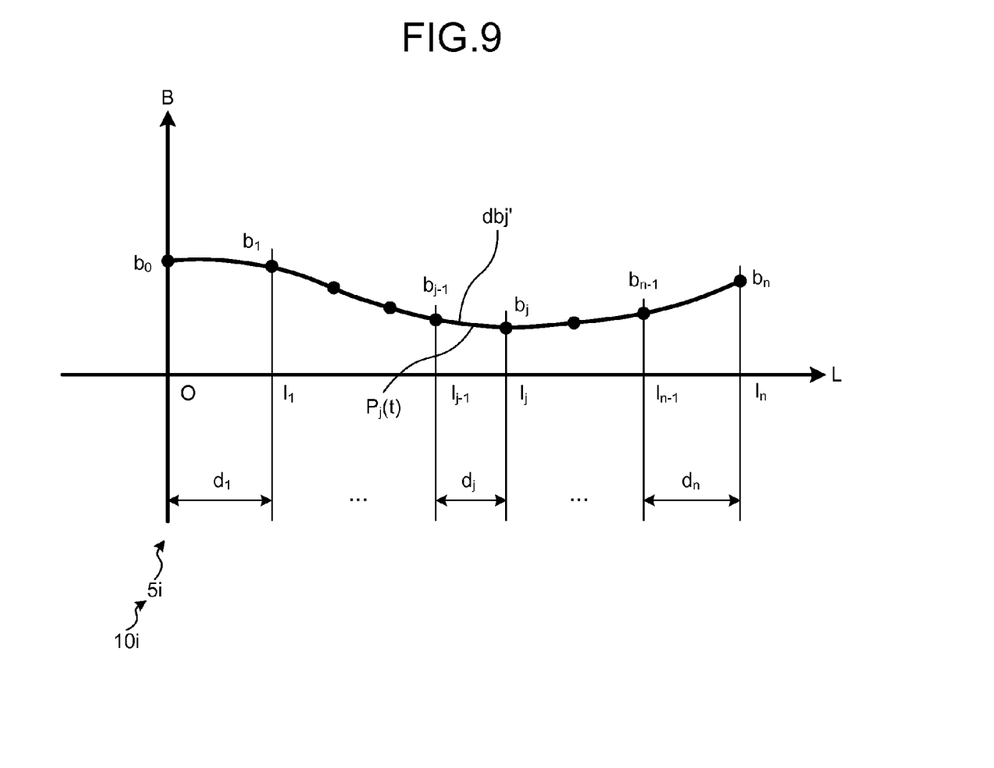
FIG. 9 is a diagram illustrating a curve obtained by combining a linear axis and one rotation axis in the first embodiment.

In this case, a curve represented by the following Formula (14) is considered as a spline curve smoothly passing on a two-dimensional plane of L-B as illustrated in FIG. 9:

$$P_j(t)=[Pl_j(t),Pb_j(t)] \tag{14a}$$

In this case, a distance $d_j'$ between the sequence of points is represented as indicated by the following Formula (15a):

$$d_j'=\sqrt{\{(l_j-l_{j-1})^2+(b_j-b_{j-1})^2} \tag{15a}$$

In Formula (15a), the above Formula (11) clearly holds.

According to Formulas (6), (15a), and (11), it is understood that $db_j=db_j'$ holds. Consequently, the B-axis component $Pb_j(t)$ of the spline curve calculated by using Formula (14a) coincides with the B-axis component of the spline curve calculated by using Formula (13a). That is, $Pb_j(t)$ of the spline curve calculated by using Formula (13a) can be regarded as a curve equation in which the B axis of the rotation axes smoothly changes in synchronization with the movement between the designated sequences of points of the linear axes.

Similarly, concerning the C axis, Formulas (1), (3), (4a), and (4b) are defined on the axis components of x, y, z, and c by setting the distance $d_j$ between the sequence of points to $dc_j$ of Formula (12b). The spline curve of Formula (1) can be decomposed into components of the axes and are calculated as indicated by the following Formula (13b):

$$P_j(t)=[Px_j(t),Py_j(t),Pz_j(t),Pc_j(t)] \tag{13b}$$

As in the case of the B axis, the C-axis component $Pc_j(t)$ of Formula (13b) can be regarded as a curve equation in which the C axis of the rotation axes smoothly changes in synchronization with the movement between the designated sequence of points of the linear axes.

Consequently, in the second embodiment, for example, the distal-end-position-curve generating unit derives the spline curve by Formula (5) from the sequence of points of the position designates of the linear axes. The tool-posture-curve generating unit generates, from the sequence of points of the designated positions of the linear axes and the rotation axes, the tool posture curve by Formulas (13a) and (13b) on the basis of the combined axes obtained by combining the rotation axes with the linear axes one by one.

Figure 10:
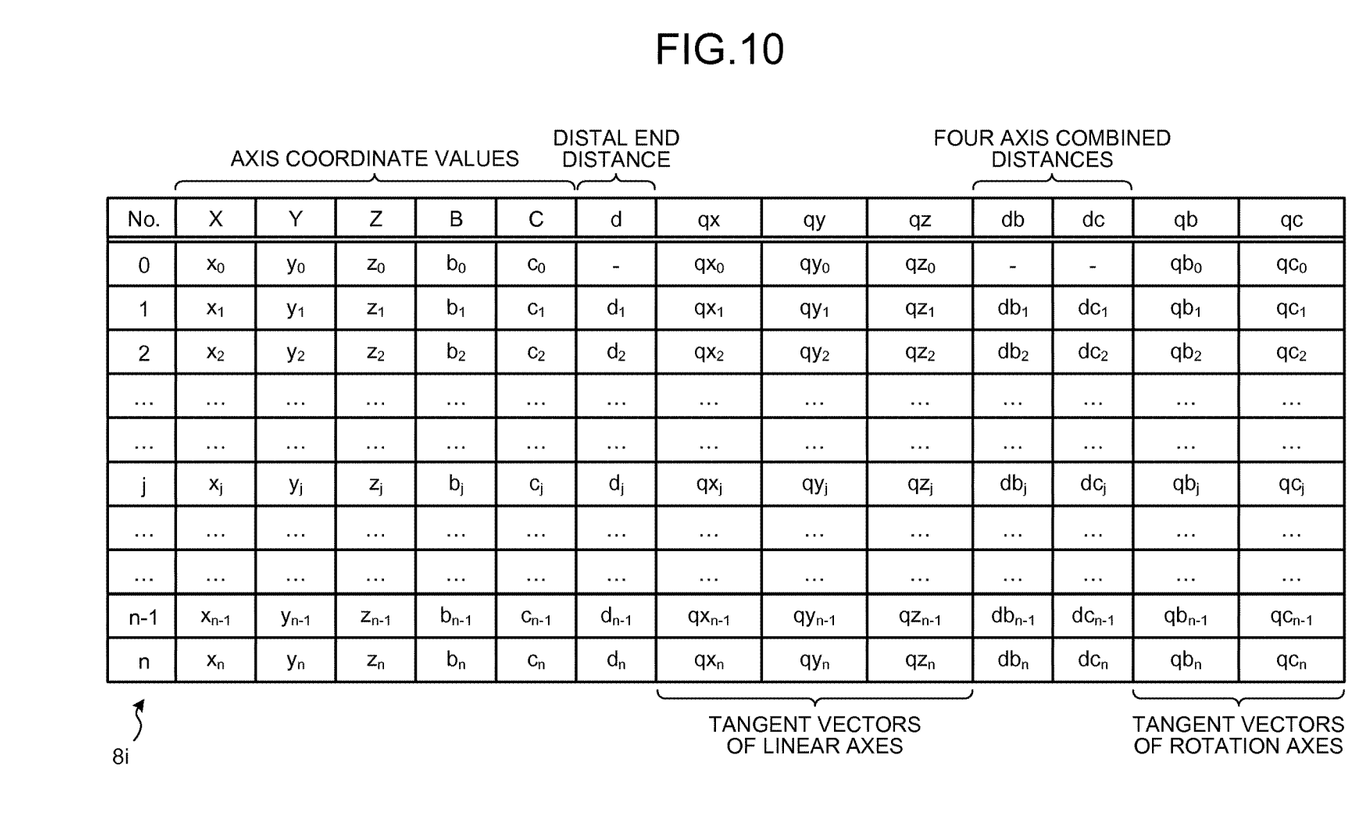
FIG. 10 is a diagram illustrating the configuration of a data table in a second embodiment.

Specifically, the operation of the tool-posture-curve generating unit 5i is different from the operation in the first embodiment as illustrated in FIG. 9. Contents of a data table 8i are different from the contents in the first embodiment as illustrated in FIG. 10.

That is, among data set in the data table 8i by the program input unit 2, $db_j$ represents an inter-point distance in a four-dimensional space in which the four axes, i.e., the three linear axes and the B axis of the rotation axes are combined for the designated sequence of points $P_j(x_j, y_j, z_j)$ of the linear axis and the designated sequence of points $V_j(b_j, c_j)$ of the angle representing the tool posture and is represented by the above Formula (12a). $dc_j$ represents an inter-point distance in a four-dimensional space in which the four axes, i.e., the three linear axes and the B axis of the rotation axes are combined for the designated sequence of points $P_j(x_j, y_j, z_j)$ of the linear axis and the designated sequence of points $V_j(b_j, c_j)$ of the angle representing the tool posture and is represented by the above Formula (12b).

In the curve generating unit 3, the tool-posture-curve generating unit 5i generates, from the data table 8, a curve equation in which the tool posture smoothly changes while passing through designated points. As a procedure of the generation, here designated points $P_j'$ consisting of coordinate values of the tool distal end and coordinate values of a part of the tool posture are represented as $P_j'=(X_j, Y_j, Z_j, B_j)$; a distance $db_j$ between designated sequence of points obtained by combining the three linear axes and the B axis of the rotation axes is set to $d_j$ (see Formula (12a) and FIG. 5); and tangent vectors at the designated points $P_j'$ are represented as $q_j'=(qx_j, qy_j, qz_j, qb_j)$. Then, from Formula (3) in which second derivative of a curve line is continuous, and Formulas (4a) and (4b) which are end point conditions under which curvatures are 0 at a start point $P_0'$ and an end point $P_n'$ of the curve, calculated are the components $qb_j'$ (n=0, 1, . . . , and n) of (n+1) tangent vectors from the (n+1) simultaneous equations concerning only components of the B axis. Then, stored is a calculated result in the data table 8i as a B-axis component qb (see FIG. 10) of tangent vectors of the rotation axes.

Subsequently, it is supposed that designated points $P_j''$ consisting of coordinate values of the tool distal end and coordinate values of a part of the tool posture are represented as $P_j''=(X_j, Y_j, Z_j, C_j)$; a distance $dc_j$ between designated sequence of points obtained by combining the three linear axes and the C axis of the rotation axes is set to $d_j$ (see Formula (12b) and FIG. 9); and tangent vectors at the designated points $P_j''$ are represented as $q_j''=(qx_j, qy_j, qz_j, qc_j)$. By using Formula (3) in which second derivative of a curve line is continuous and Formulas (4a) and (4b) which are end point conditions under which curvatures are 0 at a start point $P_0''$ and an end point $P_n''$ of the curve, the tool-posture-curve generating unit 5i calculates $qc_j'$ (n=0, 1, . . . , and n) of (n+1) tangent vectors by using the (n+1) simultaneous equations concerning only components of the C axis. The calculated result is stored in the data table 8i as a C-axis component qc (see FIG. 10) of tangent vectors of the rotation axes.

As described above, in the second embodiment, the tool-posture-curve generating unit 5i performs the processing for, for each of a plurality of rotation axes, generating a tool posture curve using combined axes of one rotation axis and linear axes so as to extract a rotation axis component of the tool posture curve. Consequently, it is possible to make the movement of the rotation axes forming the tool posture curve smooth movement associated with the movement of the tool distal end position. As a result, it is possible to interpolate the tool distal end position along a smooth curve passing through a distal end position designated by a machining program, and further it is possible to obtain an interpolation result for smoothly changing rotation of the two axes, which give a tool posture, in synchronization with the movement of the tool distal end while passing through a posture designated by the machining program.

INDUSTRIAL APPLICABILITY

As described above, the numerical control apparatus according to the present invention is useful for numerical control of a machine tool.

REFERENCE SIGNS LIST

1 Machining program
2 Program input unit
3 Curve generating unit

4 Tool-distal-end-position-curve generating unit
5, 5i Tool-posture-curve generating unit
6 Interpolation calculating unit
7 Interpolation output unit
8, 8i Data table
9 Servo driving unit
10, 10i Numerical control apparatus
100 Machine tool
101 Table
102 Tool
102a Distal end position

The invention claimed is:

1. A numerical control apparatus that numerically controls a machine that has a tool, a linear axis, and a rotation axis based on a machining program that includes a command for a tool distal end position determined by a position of the linear axis and a command for a tool posture determined by a rotation angle of the rotation axis, the numerical control apparatus comprising:
 a program input unit that reads the tool distal end position and the tool posture designated in continuous blocks in the machining program and generates a first designated position sequence of the linear axis and a second designated position sequence of the rotation axis;
 a distal-end-position-curve generating unit that generates, based on points in the first designated position sequence of the linear axis, a tool distal end position curve concerning the tool distal end position;
 a tool-posture-curve generating unit that generates, based on a combined position sequence including the points in the first designated position sequence of the linear axis and points in the second designated position sequence of the rotation axis, a tool posture curve concerning the tool posture associated with movements of the tool distal end position;
 an interpolation calculating unit that, at each of interpolation cycles, calculates an interpolation point of the tool distal end position from the tool distal end position curve, calculates an interpolation point of the tool posture from the tool posture curve, and calculates an interpolation point of a machine position of the linear axis in accordance with the interpolation point of the tool distal end position and the interpolation point of the tool posture; and
 an interpolation output unit that moves the linear axis to the calculated interpolation point of the machine position and moves the rotation axis to the calculated interpolation point of the tool posture,
 wherein the distal-end-position-curve generating unit generates the tool distal end position curve 1a calculating, based on distances between respective points in the first designated position sequence of the linear axis, tangent vectors at the respective points of the first designated position sequence at a conditions that second derivative values of a spline curve are continuous at the respective points of the first designated position sequence, and
 the tool-posture-curve generating unit generates the tool posture curve by calculating, based on distances between respective points in the combined position sequence of the linear axis and the rotation axis, tangent vectors at the respective points in the combined position sequence at a condition that second derivative values of the spline curve at the respective points in the combined position sequence are continuous.

2. The numerical control apparatus according to claim 1, wherein the rotation axis is one of a plurality of rotation axes, and
 the tool-posture-curve generating unit generates the tool posture curve using the distances between the respective points in the combined position sequence of the linear axis and the plurality of rotation axes at the condition that the second derivative values of the spline curve at the respective points in the combined position sequence are continuous.

3. The numerical control apparatus according to claim 1, wherein the rotation axis is one of a plurality of rotation axes, and
 the tool-posture-curve generating unit performs, for each of the plurality of rotation axes, processing for generating the tool posture curve using the distances between the respective points in the combined position sequence of one rotation axis, among the plurality of rotation axes, and the linear axis and extracting a rotation axis component of the tool posture curve at the condition that the second derivative values of the spline curve at the respective points in the combined position sequence are continuous.

* * * * *